United States Patent
Dos Remedios et al.

(10) Patent No.: US 7,599,290 B2
(45) Date of Patent: Oct. 6, 2009

(54) METHODS AND SYSTEMS FOR PROVIDING QUALITY OF SERVICE IN PACKET-BASED CORE TRANSPORT NETWORKS

(75) Inventors: Rene Maria Buniel Dos Remedios, Muntinlupa (PH); Joel Cruz Delos Angeles, Binan (PH); Ma Josefa Betia Eliseeff, Paranaque (PH)

(73) Assignee: Latitude Broadband, Inc., Taguig (PH)

( * ) Notice: Subject to any disclaimer, the term of this patent is extended or adjusted under 35 U.S.C. 154(b) by 412 days.

(21) Appl. No.: 11/463,908

(22) Filed: Aug. 11, 2006

(65) Prior Publication Data

US 2008/0037552 A1    Feb. 14, 2008

(51) Int. Cl.
*H04L 1/00*    (2006.01)
(52) U.S. Cl. ............... 370/230.1; 370/231; 370/235; 370/236.2
(58) Field of Classification Search ............ 370/395.21, 370/395.2, 230–234
See application file for complete search history.

(56) References Cited

U.S. PATENT DOCUMENTS

| | | | | |
|---|---|---|---|---|
| 6,594,265 B1 * | 7/2003 | Etorre et al. | ........... | 370/395.51 |
| 6,690,678 B1 * | 2/2004 | Basso et al. | ................. | 370/468 |
| 6,763,000 B1 * | 7/2004 | Walsh | .......................... | 370/252 |
| 6,765,873 B1 * | 7/2004 | Fichou et al. | ................. | 370/235 |
| 7,012,893 B2 * | 3/2006 | Bahadiroglu | ................. | 370/231 |
| 7,082,102 B1 * | 7/2006 | Wright | ........................ | 370/229 |
| 2005/0276218 A1 * | 12/2005 | Ooghe et al. | ................. | 370/229 |
| 2008/0002576 A1 * | 1/2008 | Bugenhagen et al. | ........ | 370/229 |

* cited by examiner

*Primary Examiner*—Jayanti K Patel
*Assistant Examiner*—Anthony Sol

(57) ABSTRACT

Methods and systems for providing necessary and sufficient quality-of-service (QoS), in a packet-based core transport network that utilizes dynamic setting of bandwidth management pipes or thresholds to obviate link congestion are disclosed. Congestion avoidance is a necessary and sufficient requirement in order to guarantee Quality of Service (QoS) in packet-based core networks.

A typical network is composed of a plurality of backbone links connecting edge nodes where backhaul links are aggregated. The backhaul links connect the backbone links to the remote sites serving the subscribers. In order to enforce bandwidth management policies, Access Controllers, which perform traffic shaping, are situated on each remote site.

In the event of a violation of certain link threshold settings, dynamic adjustment of the bandwidth management policies on affected Access Controllers is enforced. Various algorithms in determining the correlation between the link nearing congestion and the source or destination of traffic streams are also discussed. This invention implements a feedback control loop wherein probes at various points in the network checks for congestion states to guide bandwidth management threshold decisions in order to maintain the condition of non-congestion throughout the network. Capacity planning and congestion avoidance mechanisms work hand-in-hand to fulfill Service Level Agreements (SLA).

10 Claims, 8 Drawing Sheets

METHODS AND SYSTEMS FOR PROVIDING QUALITY OF SERVICE IN PACKET-BASED CORE TRANSPORT NETWORKS

CROSS-REFERENCE TO RELATED APPLICATIONS

This application acknowledges the benefits of U.S. Pat. No. 6,765,873 entitled "Connections Bandwidth Right Sizing Based On Network Resources Occupancy Monitoring" by Fichou, et. al. filed on Jun. 29, 2000 and patented on Jul. 20, 2004, and U.S. Pat. No. 6,931,011 B2 entitled "Methods And Systems For Bandwidth Management In Packet Data Networks" by Giacopelli, et. al. filed on Jan. 31, 2001 and patented on Aug. 16, 2005, the disclosure of which are incorporated herein by reference in its entirety.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

As more and more users become acquainted with the use of the Internet, the demand to service various applications imposed upon this packet-based network increases. To date, network operators are daunted with the challenges to deliver quality-of-service (QoS) in the midst of compounding network-related issues and the advent of more demanding applications and services. Network performance can degrade as observed from high latencies and incremental packet drops. Problems like link congestion that dramatically affect user perception of service being offered by the IP transport best-effort network must be resolved immediately. Any hindrance to meeting the required service level of agreement (SLA) has direct implication on the network business profitability. As such, their current resource management mechanisms need to be re-examined, and other alternatives should be explored and evaluated as well, in order to determine the best approach in addressing network congestion.

If a backbone link has a lower capacity implementation as opposed to the total capacity of the backhaul links aggregated to it, a capacity mismatch is present. This mismatch is a typical consequence for networks that have initiated on minimizing recurring costs by limiting capacity of each backbone link, such as T1/E1 leased lines, and making the most possible utilization out of every backhaul link terminated to the former. The premise that is widely considered by large network providers is that, due to the important number of customers boarded, the diversity of the locations, and the different types of service requested, there is a very low probability that a high number of connections will be active at the same time, as described by Fichou, et. al. U.S. Pat. No. 6,765,873 B1. This may therefore permit more connections to be established on the backbone link than its actual total bandwidth capacity can handle. However, problems arise when strict queuing disciplines applied are not sufficient to provide guaranteed service if too much traffic is being admitted. This is a result of customers who have significantly increased their usage while employing diverse applications that lead to the prevailing network congestion issue. On the other hand, adjusting the committed information rate (CIR) of the subscribers, as proposed in this prior art, will tend to violate the Service Level Agreement (SLA).

In a congested network, resource and admission control functions are required as presented in U.S. Patent document pending for approval, submitted by Dos Remedios, et. al., entitled "Methods and Systems for Call Admission Control and Providing Quality-of-Service in Broadband Wireless Access Packet-Based Networks". In an embodiment of this invention, an Access Controller is defined and deployed in access to transport and transport to transport interface points where there is a capacity mismatch. The Access Controller executes buffer management and queuing, and further guarantees QoS by managing and sharing the bandwidth of the transport component of a lower capacity. It performs access control by authenticating the requester and allocates both committed information rate (CIR) and maximum information rate (MIR) to each subscriber terminal based on their respective user profile stored in the database. It can also be a crucial part of a Call Admission Control system that considers the physical transport capacities along with the on-going sessions to ensure service integrity. This Access Controller fundamentally performs policy enforcement of the Resource and Admission Control Functionality (RACF) as depicted in ITU Next Generation Network standards.

The concept of having total end-to-end QoS in NGN philosophies can be achieved if network providers are capable of accessing and managing their network resources efficiently. In order to implement the concept of congestion avoidance being a necessary and sufficient condition for QoS, the state of congestion within the entire network needs to be known. A feedback control mechanism must be used to relay the congestion state information to a Core QoS Manager which will in turn relay the proper control or threshold management signals to the Access Controllers. The policy enforcement decisions made by the Core QoS Manager are passed onto the Access Controllers to address congestion state at specific points in the network, whereby implementing the needed and adequate bandwidth management actions. The Core QoS Manager, therefore, provides the mapping that is necessary to correlate specific Access Controller actions to specific network congestion conditions. It furthermore requires a feedback control mechanism that is capable of responding within a time constant adequately faster than the rate of change of the congestion state in the network. Hence, this feedback control mechanism must adhere to Nyquist sampling rules. Both near real-time monitoring and feedback mechanism play crucial roles in the Resource and Admission Control Function (RACF). Updates on network congestion state spanning both access and core domains are fed into the Network Management System. This data is used by the QoS Manager to give specific instructions to the Access Controllers. Since the challenge exists when bottlenecks occur due to contention of resource, the use of dynamic bandwidth allocation to transport pipes must be enforced to protect the network and to make sure that traffic is controlled. Dimensioning for network scalability, on the other hand, can also be performed using data obtained from this feedback mechanism. Threshold settings for dynamic adjustment of bandwidth management policies on affected Access Controllers shall be defined and illustrated in the succeeding sections of this paper.

BRIEF SUMMARY OF THE INVENTION

The main object of the present invention is to allow near real-time dynamic threshold setting of bandwidth management pipes in the core transport IP-based networks, as a controlled mechanism for avoiding congestion. Congestion avoidance is a necessary and sufficient requirement in order to guarantee Quality of Service (QoS) in packet-based core networks. The above-mentioned goal is achieved through an NMS, the Access Controllers, and a Core QoS Manager, to implement an over-all QoS provisioning system in accordance with independent claims itemized herein.

The method provided by the present invention comprising the steps of:

1. Monitoring and reporting of network link utilization and congestion state;
2. Monitoring of violations of capacity threshold settings of congestion states;
3. Correlating backbone and backhaul link congestion states with corresponding source or destination traffic streams;
4. Dynamic adjustment of source traffic stream bandwidth based on the correlation to satisfy design criteria;
5. Dimensioning mechanism for reliable network scalability.

This invention implements a feedback control loop where probes at various points in the network provide link and node capacity information to a Core QoS Manager, which in turn directs the Access Controllers to enforce the necessary bandwidth management adjustments in order to maintain the condition of non-congestion throughout the network. Such implementation is a generalized method of representing Resource and Admission Control Function (RACF) in an NGN network.

An advantage of the invention is optimized network utilization, which can efficiently carry as many revenue yielding streams as possible while doing a fair sharing of available bandwidth. Packet losses and latencies that fall below alert levels can be seen, as the system actively reacts to changes in bandwidth availability, wherein appropriate dynamic traffic-shaping is implemented before congestion occurs.

Since the invention optimizes network resources, it allows for upgrades only when and where design criteria and corresponding detailed methodology to alleviate network congestion herein, have already been exhausted. Both passive and active measurement algorithms aid for determining the focal points that need immediate traffic-shaping for reliable and stable network performance. This further minimizes expenditures attributed to additional cost needed for deploying highly-specialized personnel to troubleshoot network-related problems, and consequently for manning increased demand for customer care support.

Moreover, capacity planning for network expansion can be easily analyzed and modeled with the frequency that links have violated certain thresholds, for which its data can be statistically sampled over a finite time interval for dimensioning.

BRIEF DESCRIPTION OF THE SEVERAL VIEWS OF THE DRAWINGS

The drawings below serve to better illustrate the embodiments presented in this paper. However, they are not to be construed as limiting the invention.

DETAILED DESCRIPTION OF THE INVENTION

Figure 1:
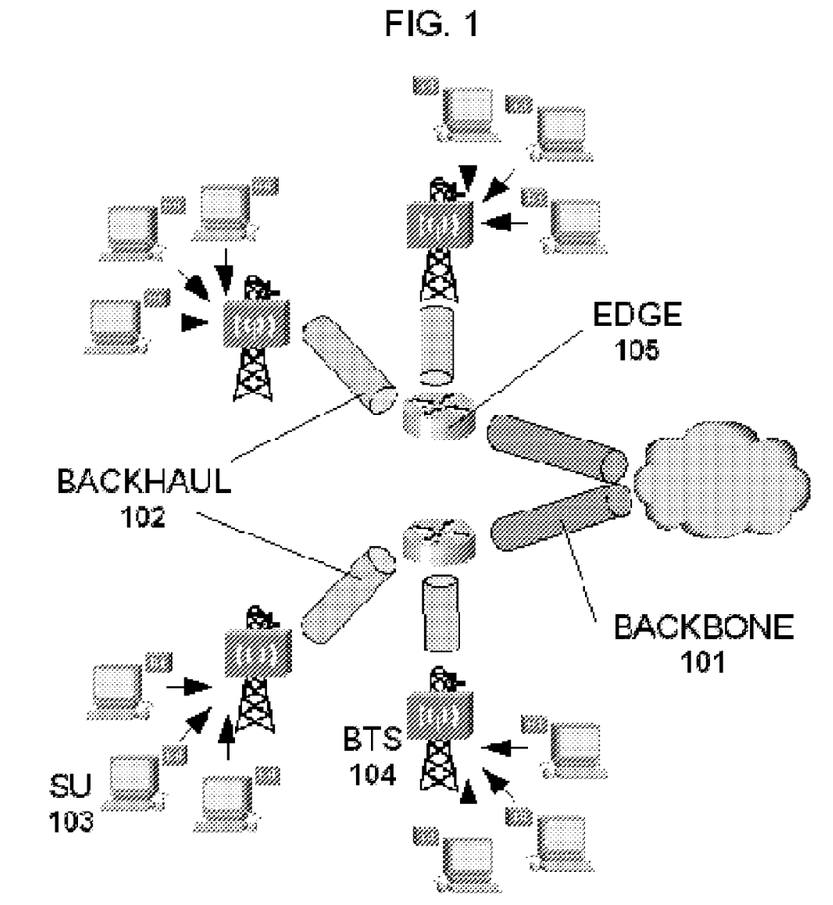
FIG. 1 is a simplified illustration of a network topology with link-sharing properties, whose aggregation points serve as contention for resource.

FIG. 1 shows a distributed hierarchical tree topology typically implemented for scalable packet-based network architectures. It is composed of a number of nodes wherein each node allows for various services, like usable Internet services such as multimedia, to be accessible. Packet streams carrying information such as data, voice, video and other enhanced services are routed through these Internet nodes using destination-based routing, which usually traverse the shortest path through a network. The traffic aggregates at common links (backhaul 102/backbone 101) which may be prone to traffic overloads, congestion, excessive packet losses and delays. The core transport of interest is a source of contention for stream flows that can consume all available bandwidth across the shared link.

Since the bandwidth resource in this distributed network becomes the object for contention as more and more instantaneous traffic go through limited openings (for which we term a backbone link 101, the point of aggregation of backhaul 102 links), a much needed mechanism for regulating stream flows is desired. An Access Controller 604 presented in U.S. Patent document pending for approval entitled "Methods and Systems for Call Admission Control and Providing Quality of Service in Broadband Wireless Access Packet-Based Networks" by Dos Remedios, et. al. is a QoS apparatus that performs transport functions which include bandwidth management, packet filtering, traffic scheduling and prioritization. It is disseminated across the transport network encompassing both access and core backbone networks to enforce policies that control the way a requested service is provided or traffic is shaped. This ultimately implements a Resource and Admission Control functionality described in ITU-NGN papers. The Access Controller 604, thus, is the needed mechanism to properly manage the bandwidth and capacities available in the network.

To prevent poor network performance, sophisticated systems such as the Network Monitoring System (NMS) 603, Core QoS Manager 603, and Access Controllers 604, for monitoring, policy control, and policy enforcement, respectively, are implemented to respond to the changing network conditions in near real-time fashion. The Network Monitoring System 603, as described in U.S. Patent document pending for approval submitted by Dos Remedios, et. al., consists of a database that is aware of the network topology, network entities, and traffic conditions. The Core Qos Manager 603, a software module independent of or residing within the NMS 603, controls the Access Controllers 604 which in turn implements the core QoS policies by enforcing resource management.

Together, the NMS 603, Core QoS Manager 603, and Access Controllers 604 implement a feedback control mechanism 606 that allows the network to converge to a state without congestion, therefore guaranteeing QoS in the network. The general objective is to keep the utilization of links within desired limits. There are several forms of feedback control 606 that can be used. On/off control is simple but does not provide a quick and stable response. For instance, two utilization threshold settings can be set per link. One triggers throttling of bandwidth management settings, while the other eases the restriction. Proportional control provides quick response, but introduces error. This keeps the differential between a threshold and the utilization at a small value. However, this method needs to work with another type of control in order to handle conditions when the traffic utilization is naturally low. In general, a fast response introduces instability, while a stable response may not react to sudden changes in network conditions. A general PID (proportional integral derivative) controller may be used to tune control parameters based on the characteristics of the network to achieve optimal response. A chosen implementation will therefore be a compromise between complexity and effectiveness.

Connectivity performance metrics like utilization, Round-Trip Time (RTT) latency, jitter, and packet loss and service connectivity are sent to the NMS 603 via hardware probes, as defined in U.S. Patent document pending for approval entitled "Design and Methods for a Distributed Database, Distributed Processing Network Management System" by Dos Remedios, et. al. Alternatively, the NMS 603 can query link utilizations from other nodes in the network like router equipment. Other parameters such as packet loss and latency can also be used as thresholds to generate alarms for activation of bandwidth management policy adjustments. These parameters can be used to identify backbone links 101 which are generating threshold violation alarms. A portion of the total backbone link 301 capacity can then be distributed among the affected backhaul links 302. Various calculations are presented on how to distribute this portion of link capacity to take into consideration the SLA to each subscriber. The sample calculations presented here does not limit the scope of the invention.

Figure 2:
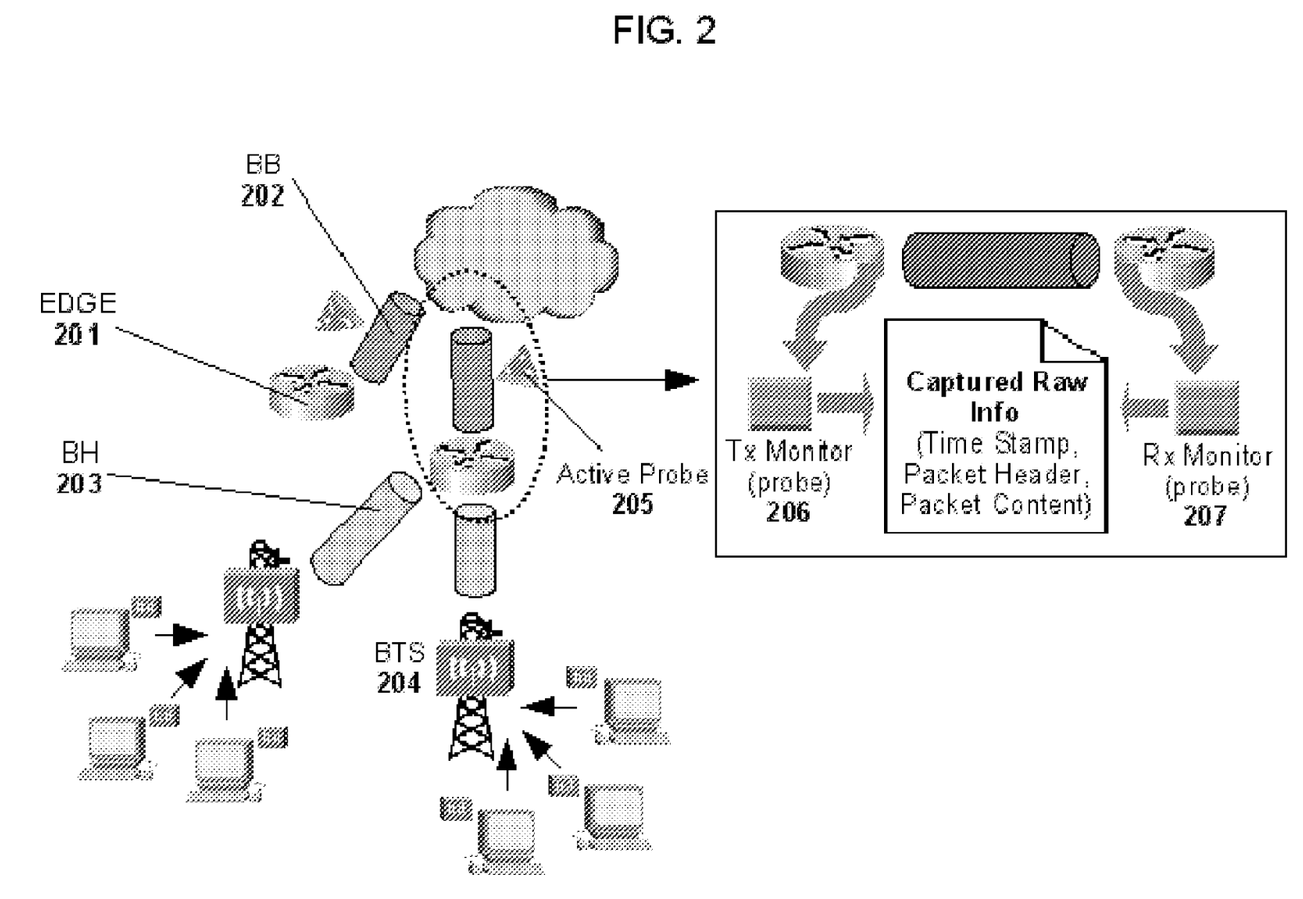
FIG. 2 shows a distinctive active probing infrastructure.
Figure 8:
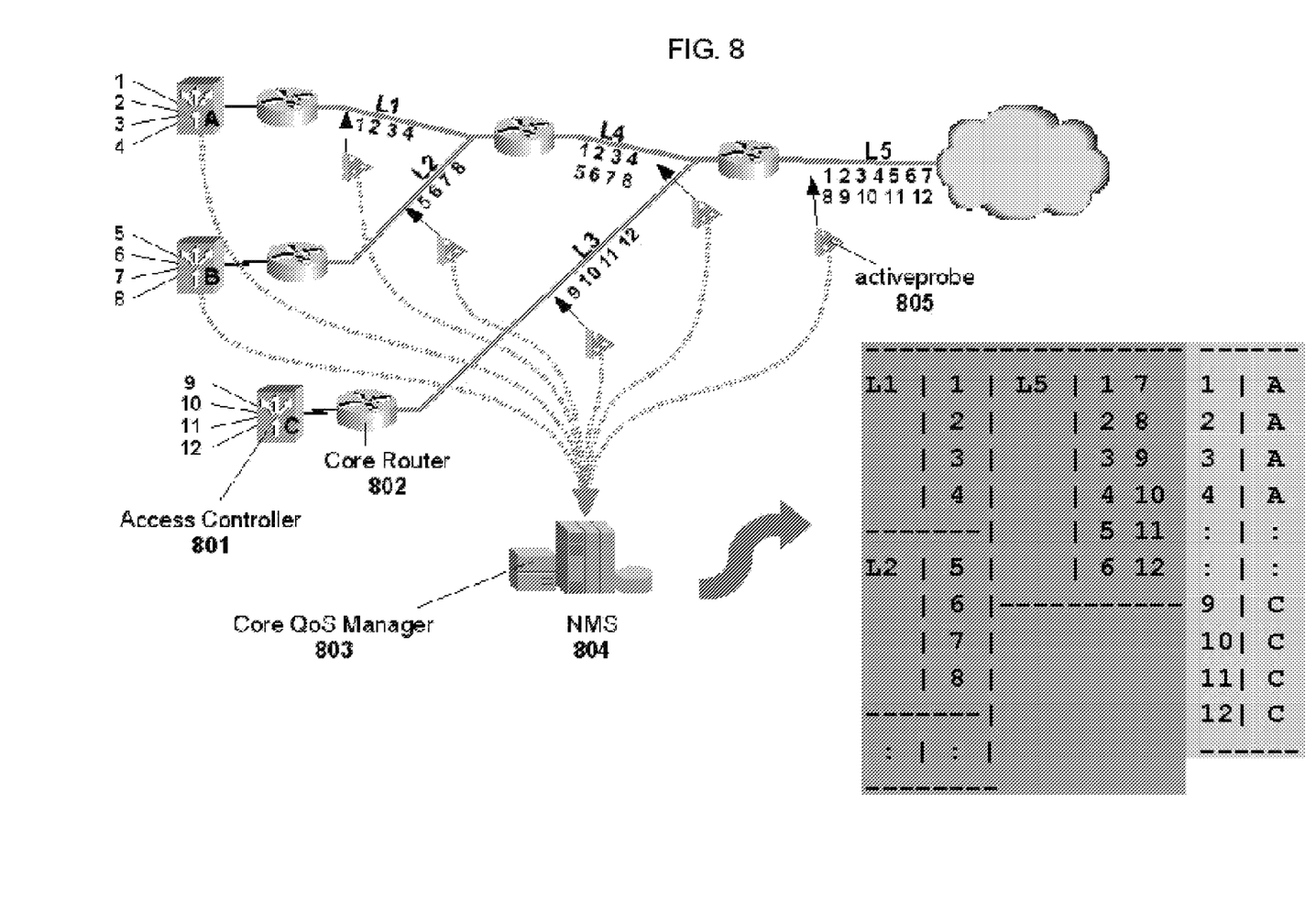
FIG. 8 depicts a Core QoS Manager performing correlation using network updates sent by active probes to impose required policy decisions onto identified affected Access Controllers.

The Network Management System (NMS) 603 may either use active or passive techniques to determine the affected backhauls 203 or users 204 of threshold-violating links. Active monitoring probes 205, acting like highway patrols, are distributed across several links where the likelihood of bottlenecks may exist. A possible location for an active probe 205 is shown in FIG. 2. These active probes 205 send messages to the NMS 603 containing updated information for link utilization, latency, or packet loss. They also perform packet dumps to generate summaries of IP addresses or identifiers which are passing through the link. This list of identifiers as contained in packet headers 206 captured by active probes 205, together with the NMS 603 network topology database yield a list of backhaul 203 links whose Access Controller 604 bandwidth management policy must be adjusted to avoid congestion. The correlation and mapping using captured list of identifiers sent by active probes 805 are shown in detail in FIG. 8.

Alternatively, simple passive monitoring can also be implemented. In this approach, the NMS 603 just queries utilization information from network nodes and equipment 201. The links nearing congestion are then identified. Path traversal algorithms can be used to identify the affected IP addresses or backhaul links 203. Additionally, the routing tables can be queried to determine traffic flow through the network. The link and the list of users or IP addresses are correlated to determine the Access Controllers 604 whose bandwidth management policies need adjustment.

Figure 3:
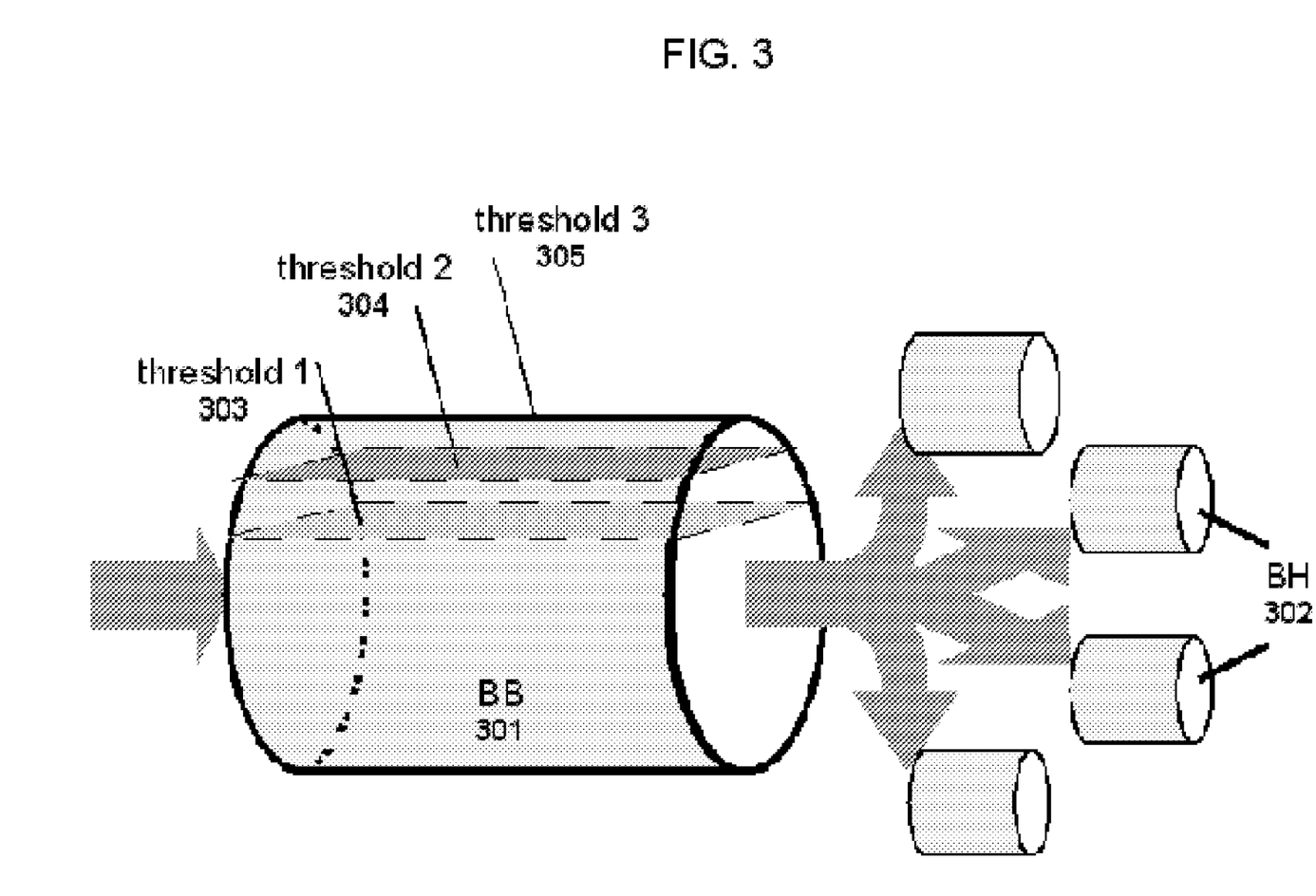
FIG. 3 shows backbone bandwidth distribution with variable threshold settings to backhaul links.

In FIG. 3, a backbone link 301 whose pipe is monitored against threshold settings, where thresholds 1 303, 2 304, and 3 305 is at say 80%, 90% and 100% of its total capacity. Threshold 1 304, for example, has been set to trigger an alarm when utilization has reached this limit, while at the same time implementing the value set at threshold 2 305 as the capacity allowed to be distributed among the backhaul 302 links terminated to it. These threshold settings, 1 303 and 2 304, enable good latency to be maintained across the link by not allowing the total pipe capacity to be used up. The Core QoS Manager 603 uses the knowledge on utilization threshold violations and other pertinent information for bandwidth management obtained from the NMS 603, to form resource management decisions based on designed core QoS policies. Since an Access Controller 604 is interfaced with both backbone 301 and backhaul 302 links, the Core QoS Manager 603 instructs the Access Controller 604 to implement the core QoS policies by adjusting the bandwidth of backhaul pipe 302 settings to fit their aggregated traffic into their shared backbone link 301. Since monitoring allows the network operator to know exactly which links generate large traffic, the thresholds in the Access Controller 604 can be set so that stations generating a large amount of traffic are penalized.

Figure 4A:
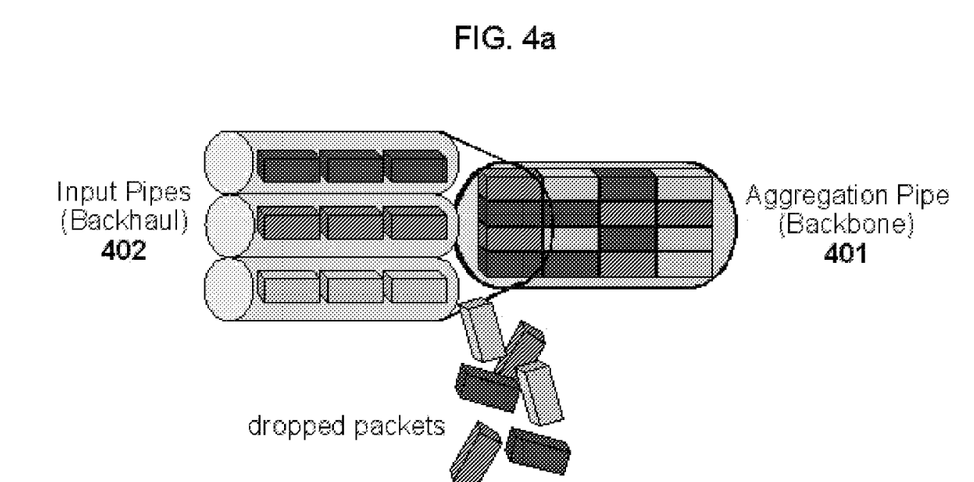
FIG. 4(a) depicts a typical bandwidth aggregation point for multiple pipes.

FIG. 4a shows a typical scenario for a congested link, wherein continuous and ill-managed traffic from input pipes or backhauls 402 are forced through a limited backbone pipe 401, which give rise to excessive packet stream crowding at this chokepoint. Packets going through a bottleneck have a high probability of being dropped or lost even if traffic shaping is implemented at the network endpoints.

Figure 4B:
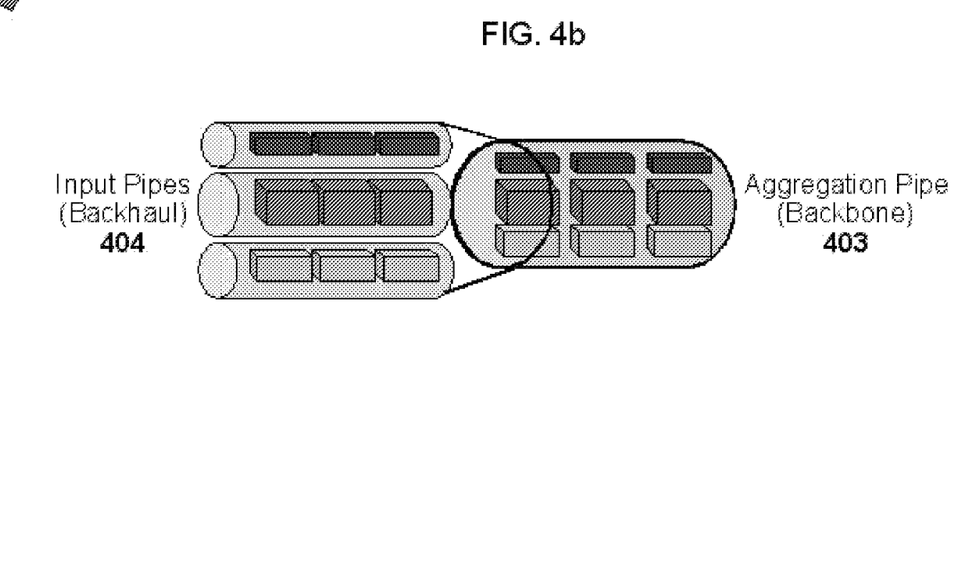
FIG. 4(b) is an illustration of bandwidth aggregation with dynamic adjustment.

In FIG. 4b however, bandwidth management is implemented at the Access Controllers 604 since it has the capability of linking access capacity (like radio BTS 104) to backhaul 402 capacity, as well as to the core network capacity through the policies issued by the Core QoS Manager 603. This kind of approach in bandwidth management creates a centralized view for core QoS, wherein the Core QoS Manager 603 is "network-aware", having a holistic idea on what is transpiring across the network in order to decide on policy enforcements that effectively achieve congestion avoidance without compromising agreed SLAs. The Core QoS Manager 603, which can be a software module in the NMS 603, essentially imparts to the Access Controllers 604 a "hint" of network conditions. This concept is an extension of the initial purpose of an Access Controller 604. Originally, an Access Controller 604 performs bandwidth management against the bandwidth of the backhaul link 402. This is a radical departure from typical bandwidth management being implemented at the access levels only like radio sector-level or BRAS traffic-shaping. Extending QoS guarantees and bandwidth management up to the core fulfills one of the necessary requirements of an NGN deployment.

Figure 5:
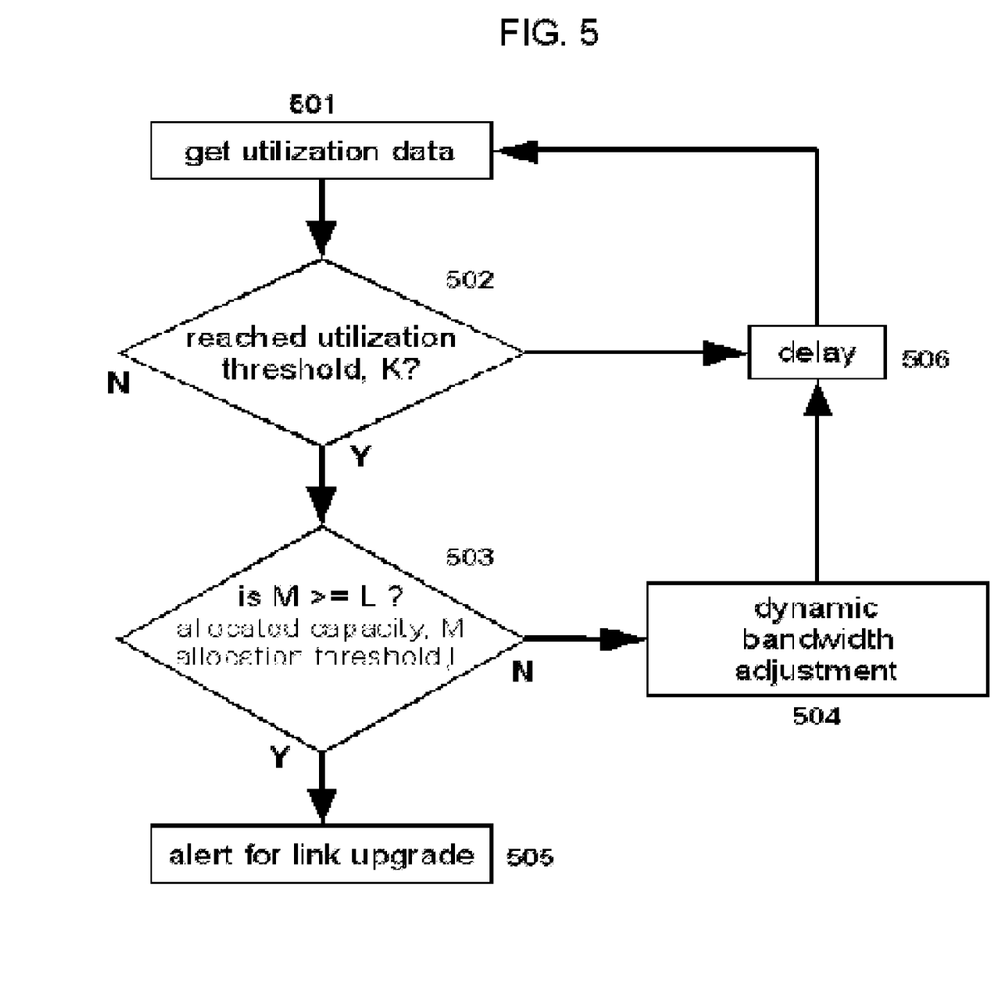
FIG. 5 is a flowchart of the steps and decisions involved in policy enforcement of bandwidth threshold control for congestion avoidance.

FIG. 5 exemplifies the method for which the decision criteria are recursively implemented inside the Core QoS Manager 603 to avoid network congestion. First, average utilization data 501 are obtained; it is then checked against a utilization threshold 502 of a link. Once a utilization threshold, K, say at 80%, is reached 502, the system checks if the allocation threshold, L, say at 50%, is less than the allocated capacity, M, which is the total committed information rate of all subscribers boarded on the affected link divided by the said affected link capacity 503. This step is performed to ensure that the Committed Information Rates, which is part of the SLAs, are not violated. A violation will trigger to advise the network operator to upgrade affected transmission link 505.

If the aggregate of the sold subscriber CIRs do not violate a threshold, the Core QoS Manager 603 performs dynamic policy adjustment by re-configuring the bandwidth policy settings on the affected Access Controllers 604. The Access Controllers 604, serving the affected subscribers or source IP addresses, then enforce the policies 504 onto the backhaul pipes 402 terminated to it. Alternatively, policy adjustment decisions can also be based on combination of utilization and other parameters such as link packet loss and latency. This is particularly useful in events of link failures or errors where alternate paths are congested. Active and passive monitoring results can be correlated to optimize policy adjustment decisions.

Dynamic adjustment design criteria are then applied by distributing a backbone link capacity fairly or in a weighted manner among the backhaul links 402. The result of the calculation is configured by the Core QoS Manager 603 into the Access Controllers 604:

$$\text{Access Controller Bandwidth Manager Pipe Setting} = \frac{\text{Backbone allocated capacity 304}}{\text{\# of Backhauls on the same affected Backbone link}}$$

Alternatively, the basis of the distribution can be correlated to the sold CIRs. This will result to a different bandwidth pipe setting depending on the number of subscribers or the sum of CIRs per Access Controller 604:

$$\text{Access Controller Bandwidth Manager Pipe Setting} = \frac{\text{Total } CIR \text{ of Subscribers in a Backhaul} \times \text{Backbone capacity 304}}{\text{Total } CIR \text{ of Subscribers sharing affected Backbone link}}$$

Another algorithm is to identify the affected Access Controller/s 604 or backhaul/s 102 which has the highest ratio/s of average utilization to their total sold CIR. Adjusting the bandwidth setting on the concerned Access Controllers 604 is a slow start process where the QoS Manager 603 will observe whether these minimal adjustments will already solve the congestion situation. The new bandwidth settings can be a percentage of the initial setting. Recurring congestion states will result to implementing bandwidth adjustments across the board on all affected Access Controllers 604, the settings of which may approach the values given in the above formulas.

Figure 6:
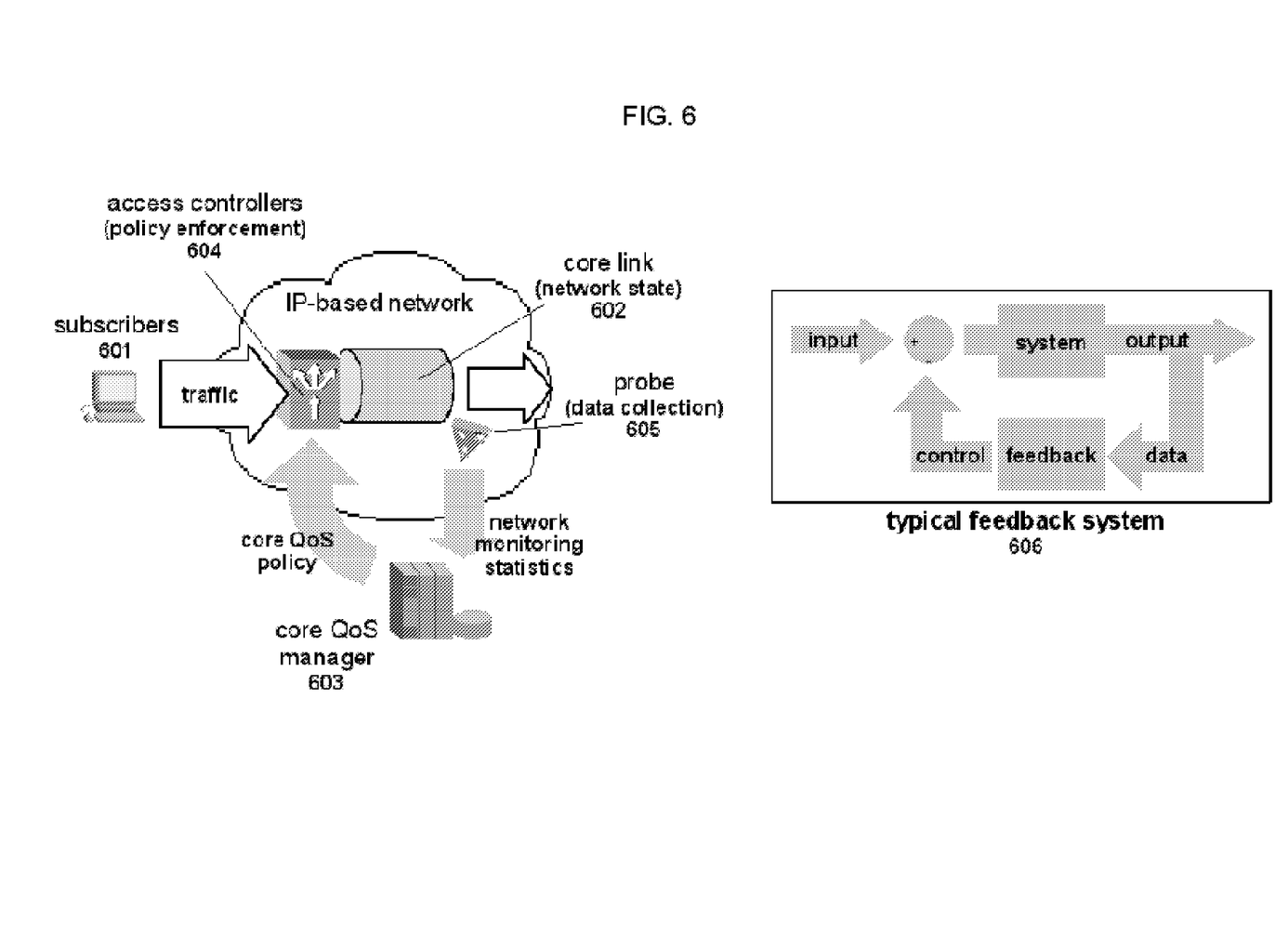
FIG. 6 illustrates the specialized embodiment of the invention for dynamic adjustment of an IP-based network architecture and the corresponding feedback control mechanism.

The aggregated subscriber traffic is then appropriately shaped at the Access Controllers 604 as depicted in FIG. 4b. The system is recursive and converges as it makes use of its knowledge of network resources availability as explicitly shown in FIG. 6. Convergence, however, is dependent on the specific type of feedback control mechanism 606 like on/off, proportional, PID, or combinations thereof.

The system can also be used to monitor congestion at the backhauls 102. The active probe software modules can be incorporated into the Access Controllers 604. The Access Controller bandwidth manager pipe can be adjusted to be equal to a value like:

$$\text{Access Controller Bandwidth Manager Pipe Setting} =$$
$$\text{Function}(\text{Total } CIR \text{ of Subscribers in a Backhaul} \times \text{Allowance Value},$$
$$\text{Maximum Subscriber } MIR \times \text{Allowance Value})$$

This method is a way of creating a perception among users that their experience is fairly the same regardless of the load in a base station or Access Controller 604. The bandwidth setting is adjusted in proportion to the number of users or sold CIRs in an Access Controller 604. This is also a way of proactively controlling the traffic that will traverse a backhaul 404, thus minimizing the probability of congestion at the backbone 403.

Variations of the cited algorithms can also be used to detect violations of sold CIR in the backhaul links 102 to trigger a link upgrade advisory. Combinations of these backbone 101 and backhaul 102 link checking algorithms can be implemented in order to guide the operator in network upgrade decisions. Bandwidth policy adjustments relating to possible congestion in the core or backbone links 101 must take precedence because more subscribers will be affected.

Figure 7:
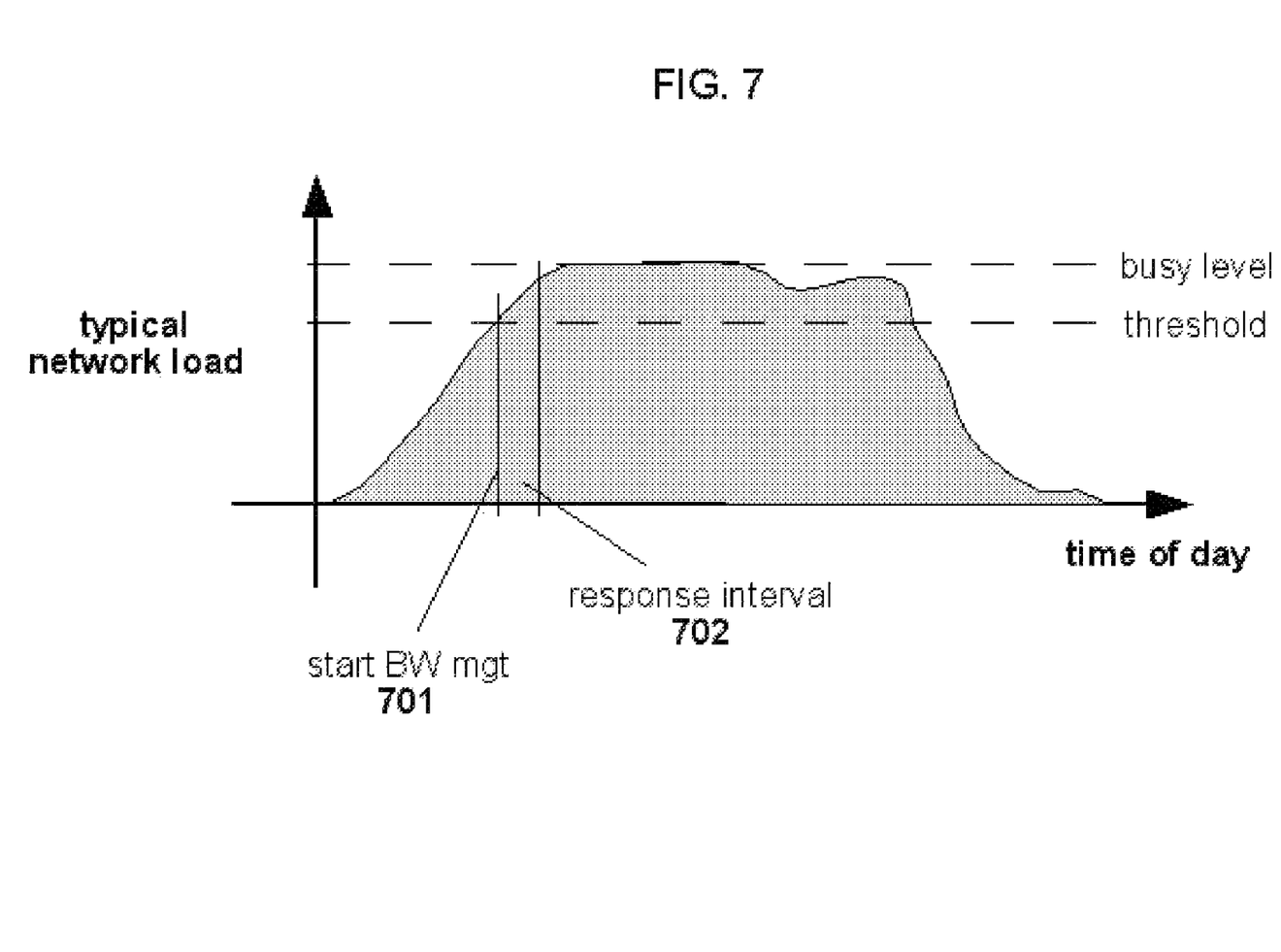
FIG. 7 illustrates a typical backbone traffic in operator networks.

In addition, low time constant, real-time adjustments may not be that necessary for an actual implementation. As shown in FIG. 7, typical network operator link traffic will be busy for certain parts of the day. Even though the instantaneous load varies, it can be expected that when a certain threshold 701 is exceeded, the average load for the network will remain high for a long time interval. For example, the response time for the network monitoring and the corresponding dynamic adjustment can be set to 5 minutes 702. Even though the network load may drop below the threshold within this time interval, it is not necessary to turn off the bandwidth control since the network load will most certainly increase again. Bandwidth adjustment will not be turned off when the network load decreases for a sufficient period of time. Sufficient sampling of the network load is achieved by just setting the response time much quicker than the time constant of the network traffic load profile.

Modifications on the decision criteria may also be implemented like tracking the sum of subscriber CIRs per link in advance as the subscribers are admitted into the network to generate link upgrade advisories. The algorithms and the formulas presented in this paper may also be modified depending on network planning parameters such as oversubscription factor which may vary according to subscriber usage profiles.

Lastly, dimensioning for network scalability can be modeled using the frequency that links have violated certain utilization or capacity thresholds as depicted above. As such, network operators can perform statistical analysis using the CIR limits alerted and viewed from the central NMS 603 to assess network needs and to be able to maintain true QoS.

What we now claim are as follows:

1. A method for avoiding congestion in a core transport network of a packet-based network, said packet-based network comprising:
    said core transport network comprising a plurality of backbone links connected to a plurality of backhaul links through a plurality of edge nodes,
    an access network comprising a plurality of subscriber terminals connected to said core transport network through a plurality of access controllers, wherein
    said access controllers perform resource and admission control functions, said method comprising:
    a. identifying access controllers that are a source or destination of packets traversing each said backbone and backhaul links,
    b. utilizing a plurality of monitoring probes in said core transport network to identify at least one of said backbone or backhaul links that is nearing congestion and to trigger a dynamic bandwidth adjustment, c. determining bandwidth settings for affected access controllers that are the source or destination of packets traversing each of the backbone or backhaul links nearing congestion, d. checking if subscribers' service level agreements in the backbone or backhaul links nearing congestion are violated, e. enforcing said bandwidth settings to said affected access controllers if said subscribers' service level agreements in the backbone or backhaul links nearing congestion are not violated, f. notifying a network operator to implement a capacity upgrade if said subscribers' service level agreements in the backbone or backhaul links nearing congestion are violated, whereby said avoiding congestion in said core transport network will provide necessary and sufficient quality-of-service in said core transport network of said packet-based network.

2. The method of claim 1, wherein said identifying said access controllers that are the source or destination of packets traversing each said backbone and backhaul links is done by correlating a list of identifiers contained in packet headers captured by the monitoring probes in said backbone and backhaul links and a network topology database from a network management system.

3. The method of claim 1, further including identifying said access controllers that are the source or destination of packets traversing each said backbone and backhaul links from a list of backhaul links which is generated through path traversal.

4. The method of claim 1, wherein said utilizing said plurality of monitoring probes in said core transport network to identify at least one of said backbone or backhaul links that is nearing congestion and to trigger said dynamic bandwidth adjustment is performed by configuring said monitoring probes to observe a plurality of connectivity performance metrics in each said backbone and backhaul links and to check if at least one of said connectivity performance metrics has reached corresponding predetermined connectivity threshold settings.

5. The method of claim 4, wherein said dynamic bandwidth adjustment is implemented using a proportional integral derivative control mechanism.

6. The method of claim 4, wherein said monitoring probes are configured to observe said connectivity performance metrics in each said backbone and backhaul links with response times quicker than time constants of network traffic load profiles of each said backbone and backhaul links.

7. The method of claim 1, wherein said determining said bandwidth settings for said affected access controllers that are the source or destination of packets traversing each of the backbone or backhaul links nearing congestion is performed by utilizing a plurality of algorithms comprising:

a. distributing an allocated backbone or backhaul capacity equally or weighted among said affected access controllers;

b. distributing said allocated backbone or backhaul capacity among said affected access controllers in proportion to their sum of subscriber committed information rates in the backhaul links interfaced to said affected access controllers;

c. identifying access controllers with highest ratios of backhaul utilization to said sum of subscriber committed information rates in the backhaul links interfaced to said affected access controllers and performing a slow start process to set their said bandwidth settings at a percentage of their initial settings;

d. configuring said bandwidth settings of said affected access controllers based on served subscriber committed information rate or maximum information rate to proactively limit network traffic traversing the backhaul links interfaced to said affected access controllers.

8. The method of claim 7, wherein the allocated backbone capacity is configured to be less than total capacity of the backbone link nearing congestion.

9. The method of claim 7, wherein the allocated backhaul capacity is configured to be less than total capacity of the backhaul link nearing congestion.

10. The method of claim 1, wherein said checking if said subscribers' service level agreements in the backbone or backhaul links nearing congestion are violated is performed by checking if sum of subscriber committed information rates in the backbone links nearing congestion reached a predetermined backbone allocation threshold setting or checking if sum of subscriber committed information rates in the backhaul links nearing congestion reached a predetermined backhaul allocation threshold setting.

* * * * *